J. H. Palmer,
Tenoning Blind Slats.
N° 14,289.  Patented Feb. 19, 1856.

UNITED STATES PATENT OFFICE.

JOHN H. PALMER, OF ELMIRA, NEW YORK.

MACHINE FOR TENONING WINDOW-BLINDS.

Specification of Letters Patent No. 14,289, dated February 19, 1856.

*To all whom it may concern:*

Be it known that I, JOHN H. PALMER, of Elmira, in the county of Chemung and State of New York, have invented a new and Improved Machine for Tenoning Blind-Slats; and I do hereby declare that the following is a full, clear, and extact description of the same, reference being had to the annexed drawings, making a part of this specification, in which—

Figure 2:
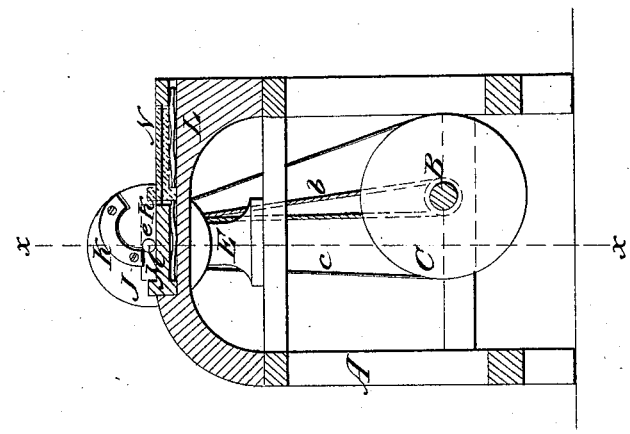
Figure 1:
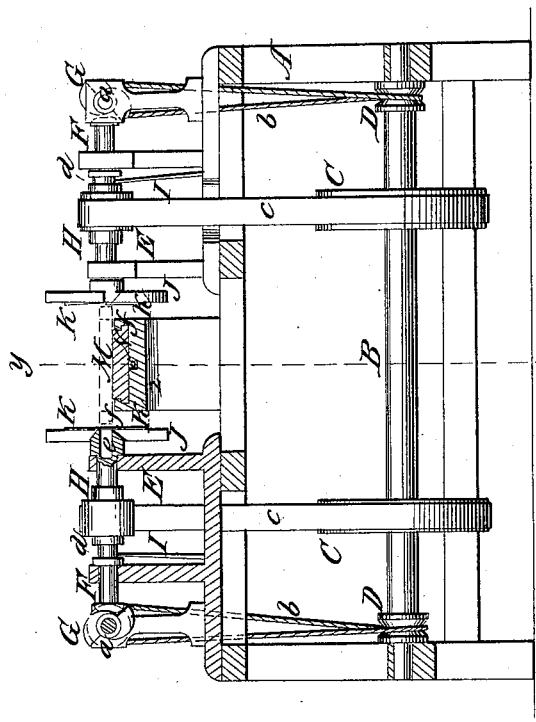

Figure 1, is a longitudinal vertical section of my improvement, (*x*), (*x*), Fig. 2, showing the plane of section. Fig. 2, is a transverse vertical section of ditto, (*y*), (*y*), Fig. 1, showing the plane of section.

Similar letters of reference indicate corresponding parts in the two figures.

To enable those skilled in the art to make and use my invention, I will proceed to describe its construction and operation.

A, represents a rectangular frame, in the lower part of which a longitudinal shaft, B, is placed. This shaft has two pulleys C, C, upon it, and also two similar pulleys D, D, one at each end. On the upper part of the frame A, there are secured two heads E, E, one at each end. These heads have each a mandrel or arbor F, fitted in them said mandrels being allowed to slide or work longitudinally in the heads. In the outer ends of the heads E, E, there are placed cams G, G, one in each head. The cams are placed upon shafts (*a*), (*a*), one end of which is provided with pulleys around which belts (*b*), (*b*), pass, said belts also passing around the pulleys, D, D, on the shaft B. On the mandrels, or arbors F, there are placed pulleys H, H, one on each mandrel, and around these pulleys belts (*c*), (*c*), pass, said belts also passing around the pulleys C, C, on the shaft B.

I, I, are springs, the lower ends of which are attached, to the beds of the heads E, E. The upper ends of these springs fit in recesses (*d*), made in the mandrels or arbors, see Fig. 1. To the inner ends of the mandrels or arbors F, F, there are attached circular disks J, J, one to each mandrel, and to the inner or face sides of the disks J, J, there are attached semi-circular cutters K, two to each disk at opposite sides of their centers. The outer ends of the cutters K, are radial with the disks and are formed with cutting edges and the concave sides of the cutters are also provided with cutting edges. The centers of the disks, J, have each a hole (*e*), made in them, and the inner ends of the cutters just touch the edges of these holes, see Fig. 2.

L, represents a bed which is placed transversely on the upper part of the frame A, and between the two disks J, J. This bed has ways or guides (*f*), (*f*), upon it, one at each side, between which a carriage M, is fitted and works. The back end of this carriage has an india rubber spring N, connected to it, the outer end of said spring being attached to the end of the bed L.

Operation: The blind slats are placed transversely upon the carriage M, and motion is given the shaft B, in any proper manner. The carriage M, is pressed by hand between the two disks J, J, and the outer ends of the cutters K, cut the slat the proper length, and the two disks are pressed inward or toward the bed L, by the cams G, G, which are operated by the belts (*b*), (*b*). As the disks are pressed toward the bed L, the cutters K, K, their concave edges, cut the tenons on the slat, the tenons entering the holes (*e*), when the prominent parts of the cams have passed the ends of the mandrels or arbors F, F, the disks J, J, are thrown back by the springs I, I, and the carriage M is thrown back from between the disks J, J, by the spring N, and another slat is placed upon the carriage to be operated upon as above described.

The above invention is extremely simple, and will operate rapidly and well. The slats are all cut of an equal length, and also the tenons, slats of different lengths may be operated upon by adjusting one of the heads F.

I do not claim the disks, J, J, and carriage, M, in themselves considered nor when operating conjointly, irrespective of the peculiar manner of operating the disks as herein described.

What I claim therefore as new and desire to secure by Letters Patent, is—

Operating the disks, J, J, to which the cutters, K, are attached by means of the cams, G, G, arranged substantially as shown for the purpose specified.

JOHN H. PALMER.

Witnesses:
 HIRAM POTTER,
 JOHN H. WILLIAMS.